2,744,016
METHOD FOR THE MANUFACTURE OF APPLE SAUCE

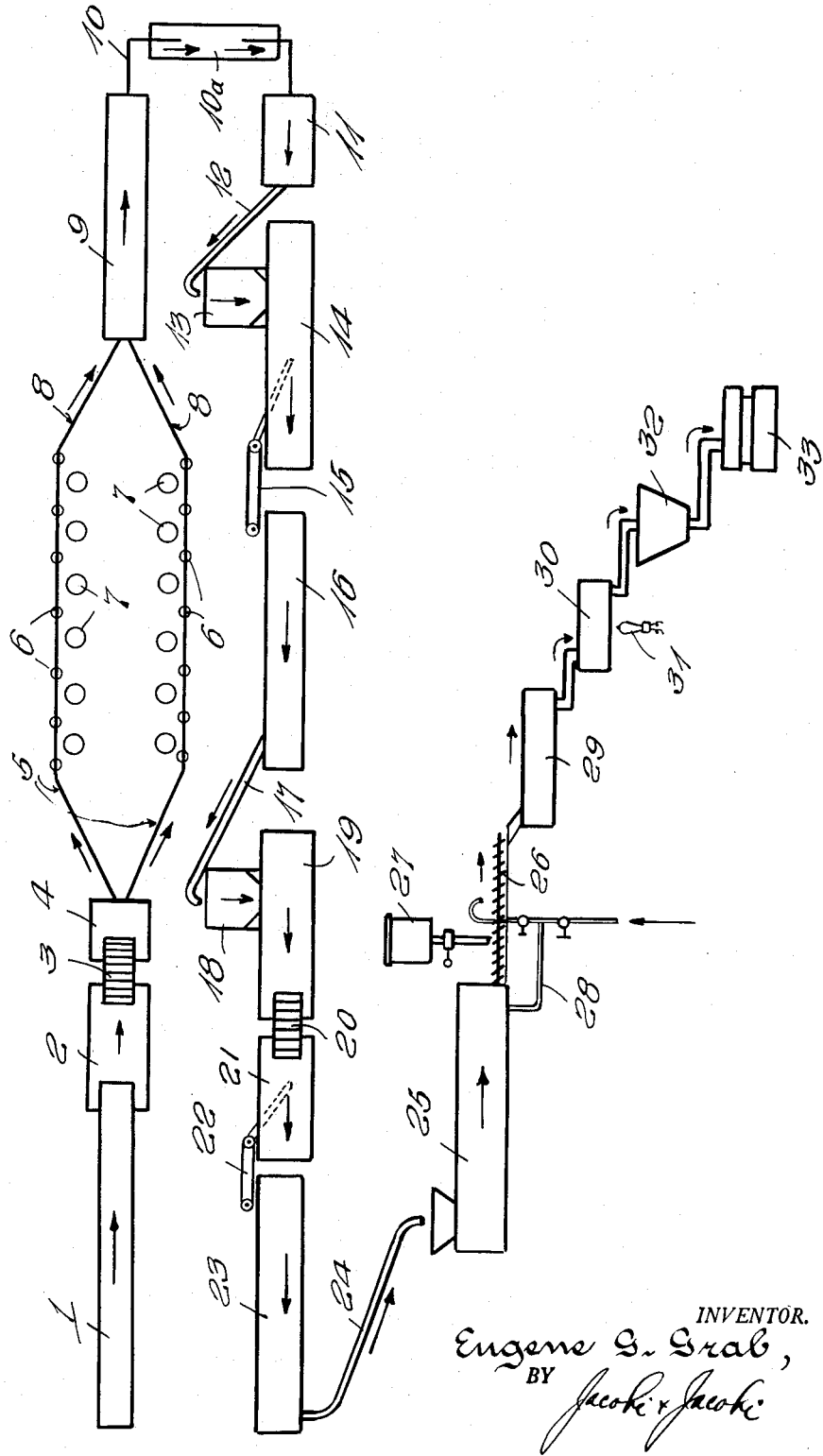

Eugene G. Grab, Silver Spring, Md.

Application September 10, 1951, Serial No. 245,903

7 Claims. (Cl. 99—101)

My invention relates to new and useful improvements in the manufacture of certain food products and more particularly to the method and apparatus for the manufacture of apple sauce, the primary object of the invention being to provide an improved method of producing such a product from any and all varieties of apples of any and all sizes.

A further object resides in the provision of a method which will reduce the number of operations and number of operators or workmen now employed in presently known processes.

Numerous other objects will appear from the following detailed description.

In the accompanying drawing, forming a part of this application, the figure is a diagrammatic view of the apparatus used in carrying out my improved method and illustrating the step by step process.

I am aware of the fact that there are in practice today methods of producing apple sauce and certain types of machines for practicing such methods, but due to the difficulties encountered in the present day methods and the machines used, I have invented my new method and apparatus to overcome the difficulties and produce better results at less expense. A present day method of manufacturing apple sauce involves the purchase of definite varieties of apples, generally of a size approximately 2½ inches in diameter and larger, although sometimes when the crop is limited the processor will purchase apples of a size approximately 2¼ inches in diameter. It is not very economical to purchase apples of this latter size for the manufacture of apple sauce, due to the fact that after the processor has removed the peel and the core, which is approximately ¾ of an inch in diameter, he has a very reduced amount of apple meat remaining.

Then, again, in the present known methods, apples are passed over an inspection belt and the poor apples, such as partly rotten ones and imperfect apples that can not be used because of the imperfections, are removed, while the 2¼ inch and smaller apples are passed through the sizing belt, while the remainder enter the preparation room. In the preparation room, these apples are placed on paring machines where the same are mechanically peeled and cored. Then the same are inspected, trimmed to rid the apples of bruises, spots, etc., and then machine chopped and passed through the apple sauce machine. This machine generally comprises a horizontal tank approximately 10 feet long and about 16 inches in diameter. Usually, it has a screw conveyor passing through the machine, and the chopped apples are conveyed through the machine by means of this conveyor. During the conveying operation through this tank, steam is introduced therein through perforated metal pipes within the tank, and this steam agitates and cooks the apples. The pressure within the machine runs about 2 or 3 pounds and the temperature within the machine is about 216° to 218° F.

Also, in the presently known and used methods, utilizing the machine aforesaid, sugar is mixed with the chopped apples before the latter enter the cooking chamber of the machine. Thus, there is an intimate mixture of apples, sugar, water and steam in this machine. Usually, the water results from the condensed steam, although at times processors add water in an extra chamber of the machine at the end of the cooking process. The results of this present day process aforesaid are not satisfactory in that the resulting apple sauce at certain times is very heavy and at other times extremely watery. This produces an inconsistent product. Furthermore, in such a method, the acid of the apples in the presence of steam has a tendency to carmelize the added sugar, which is most undesirable from a commercial viewpoint.

In the aforesaid present known method, the cooked apple, after it leaves the machine, is sent through a finishing machine which separates the cooked apple from any seed, seed cells, peels and uncooked apple. All these steps, as heretofore described in present day methods, require a large number of operations and a large number of workmen or operators. For instance, it is a known fact that 124 persons or more are required to produce approximately 3,000 cases (24 No. 2 size) of apple sauce in eight hours under this known and presently practiced method.

My invention is quite different from that heretofore described and is intended to overcome the difficulties encountered, as aforesaid, and enable a processor to produce a consistent product with less operations, less workmen, approximately 40 operators for 3,000 cases (24 No. 2 size) of apple sauce in eight hours and, of course, less expense. Also, more product with the same amount of apples than by the present method.

To this end, I may state that my process contemplates use of any and all varieties of apples of any and all sizes. Taking the apples as they come in all sizes and all varieties, the same are passed over an inspection belt, referred to in the drawing by the numeral 1, so that the inspector may remove apples that are not satisfactory for the finished product due to rotten spots or imperfect apples that can not be used because of these imperfections. By imperfect, I do not mean as to size or shape but as to the condition of the apple meat. On some occasions, apples have large cracks in them, which cracks have become contaminated during the growth of the apple and the picking of the apple, and such contaminated apples should be eliminated in order to produce a satisfactory product. After the dry inspection, the apples are passed through a mechanical washer containing a detergent and thereafter thoroughly rinsed. This mechanical washer is designated in the drawing by the numeral 2. After this washing, the apples are conveyed by conveyor 3 to a rinser 4 to remove all chemicals and extraneous matter. The apples now pass by conveyors 5 to operators who either through mechanical, chemical or physical means removes the blossom end of the apples. In the drawing, this step is represented by the numeral 6 and the operators by the numeral 7. The purpose of this treatment is to prevent particles of this blossom appearing in the finished product, as these small particles of the blossom will show up as black or brown specks in the finished apple sauce. At this same time, the operator may use a mechanical appliance to remove any blemishes that may appear on the apples, as such blemishes would ordinarily result in a poor appearing apple sauce as a finished product.

At this stage in my process, the apples are directed over conveyors 8 to an inspection belt, designated in the drawing by the numeral 9, so that any imperfect work may be detected and imperfect apples may be rehandled by a trimmer. Thereafter, the apples are washed in a solution comprising sodium bisulfite $\frac{1}{20}$ of 1%, sodium thiosulfate $\frac{1}{20}$ of 1%, ascorbic acid $\frac{1}{20}$ of 1%, citric acid 1%, salt ½% or any combination thereof or any chemical which will assist in the destruction or blanketing of enzymic action. In this particular solution, the ascorbic acid delays the oxidation process and the combination of the other chemicals inactivates the enzymes. It is a well-known fact that enzymes which occur naturally in an apple will upon exposure to air or oxygen cause the apple to brown. Naturally, this browning is very undesirable since it discolors the resultant apple sauce. Commerical apple sauce should be of a bright, slightly amber color with a tinge of green. Treated in the fashion aforementioned, apple sauce will result commercially as desired. This chemical bath treatment is referred to in the drawing by the numeral 10a, the material being conveyed on belt 10 from inspection belt 9. After the apples have been treated in the solution bath for about 1 minute's duration, the same are directed through a fresh water bath, referred to in the drawing by the numeral 11, from which point they are directed by conveyor 12 to a chopper, referred to in the drawing by the numeral 13. Following the chopping operation, the apples fall into a tank 14 containing a chemical solution similar to that above described. Extending through the tank 14 is a conveyor 15 which carries the chopped apples out of the solution and on to an inspection belt 16.

The purpose of chopping the apples and directing them into the solution and next into the washer is to separate the apple from all stems and seeds. The particles of apple will float and the stems and seeds will sink to the bottom of the tank. On the inspection belt, the inspectors reject all particles of apples which show dark spots, whether from insect action or other means. These rejected parts are returned to a trimmer for rehandling. From the inspection belt 16, the slices of apples are directed by conveyor 17 through a shredding machine 18 and from the shredder, the apples enter a tank 19 containing a chemical solution similar to that previously described. This latter step removes the last vestige of seeds or stems which are entrapped or connected with the shreds of apples, which may have been missed previously by the inspectors or trimmers.

From the last solution bath in the tank 19, the shreds of apples are conveyed by conveyor 20 through a fresh water bath in the tank 21 and then directed over by conveyor 22 to another inspection belt 23, from which they are then delivered by conveyor 24 to a continuous steam pressure apple sauce machine, designated in the drawing by the numeral 25. This steam pressure apple sauce machine comprises a device which permits the feeding of the shreds of apples thereinto without loss of pressure in the machine. A perforated belt conveyor is mounted within the machine which is in the form of a tank and upon which the shreds of apple pass therethrough. The steam pressure in the machine will be varied by the operator anywhere from 0 to 35 pounds, depending upon the variety and maturity of the apples, and while the shreds remain upon the belt and are directed through this machine, the same are not permitted to mix with the condensed steam which results from the steam contacting or meeting the cold apples. This condensed steam is trapped and removed from the machine. Thus, the apples are not mixed with water.

The cooked shreds of apple are directed from the machine 25 and are permitted to be emitted without the escape of steam from the machine. From the machine, these cooked shredded slices are directed to a type of conveyor most desired, such as a screw conveyor 26, where they are mixed with sugar in the proper amount from a sugar reservoir 27, and, if desired, with a small amount of condensed steam from the machine thru pipe 28. This latter conveyor conducts the mixture of cooked shredded slices, sugar and water to the finishing machine 29 and from the latter machine, the product is passed over a "Pyrex" or plastic inclined inspection plate 30 below which there is illumination, designated in the drawing by the numeral 31. Inspectors here remove all objectional particles in the apple sauce by means of a vacuum device. From this inspection table, the apple sauce is directed to a holding container 32 and then through a pipe line to the filling machine 33 where the product is placed in cans.

The advantages of my process above described are numerous. First, the quantity of the product is greatly increased over the present known and practiced commercial methods, due to the retention of the core and all apple meat surrounding same and the non-removal of the skin and seeds. This means lower cost of raw material, less manual labor and less cost in the production of the product. Next, vitamins and pectins which are present in the apple skin are obtained and retained in this process. Still further, the consistency of the product made under this method and on the machine referred to is uniform, as the cooked apple is not permitted to mix with the condensed steam. While the product produced under this method may be heavy, it is a known fact that one may pack very heavy apple sauce and the housewife may add water thereto as desired after opening the can. Furthermore, the final consistency of the apple sauce under this method is at all times under complete control of the operator, in that he may at any time add more or less of the condensed steam and the sugar as desired. Still further, the cooked shredded slices are processed in the machine in their original shape and are emitted from the cooker in their original shape which means that a better cooked product insofar as flavor and color are concerned results from this method. The quality is improved in taste, color and consistency.

From the foregoing description, the method of practicing my process will be readily understood and it will be seen that I have provided a comparatively simple, inexpensive and efficient means for carrying out the various objects of the invention.

Having thus described my invention, what is claimed is:

1. The continuous method of converting apples to apple sauce, comprising removing the blossom ends of unpeeled and uncored apples, coating the apples with an aqueous solution containing an oxidation inhibitor, chopping the unpeeled and uncored apples into small pieces in which the seeds and stems are substantially free from the apple meat, washing and removing stems and seeds from the apple meat in an aqueous solution containing an oxidation inhibitor, shredding the apple meat, cooking the shredded apple meat continuously with steam under pressure, adding sugar and finishing to a final product.

2. The method as defined in claim 1 in which the oxidation inhibitor is selected from the group consisting of sodium bisulfite, sodium thiosulfate, ascorbic acid, citric acid and salt.

3. The method of converting apples to apple sauce comprising washing the apples in a detergent containing bath, rinsing the apples to remove the detergent, removing the blossom ends of the apples and then coating the apples with an aqueous solution containing an oxidation inhibitor, chopping the unpeeled and uncored apples into many small pieces to loosen stems and seeds and separating the stems and seeds by flotation of the apple meat in an aqueous bath in which the stems and seeds do not float, and then cooking the apple meat.

4. The method of converting apples to apple sauce comprising washing the apples in a detergent solution, rinsing the apples free of detergent and extraneous matter, removing the blossom ends, coating the apples with an aqueous solution of an anti-oxidant, chopping the unpeeled and uncored apples into many small pieces to free the stems and seeds, separating the stems and seeds from the apple meat by flotation in an aqueous bath containing an antioxidant, shredding the apple meat to free further quantities of stems and seeds, again separating the apple meat from the stems and seeds by flotation in an aqueous bath containing an anti-oxidant, rinsing the shredded apple meat containing cores and peels but freed of stems and seeds to remove the antioxidant and then cooking the shredded apple meat.

5. The method as defined in claim 3 in which the apple meat is cooked in an gaseous atmosphere comprising wet steam under super-atmospheric pressure.

6. The method as defined in claim 3 wherein the apples are cooked in a gaseous atmosphere comprising wet steam under super-atmospheric pressure, then mixed with sugar and water and finally packaged.

7. The method of converting apples to apple sauce comprising washing sound apples with an aqueous detergent solution, rinsing detergent chemicals and extraneous matter from the apples, severing the blossom ends from the apples, coating each apple with an aqueous solution of an oxidation inhibitor selected from the group consisting of sodium bisulfite, sodium thiosulfate, ascorbic acid, citric acid and salt, chopping the apples containing both peels and cores into many small pieces to free the stems and seeds from the meat, separating the seeds and stems by flotation of the apple meat in an aqueous solution of an oxidation inhibitor, as above defined, shredding the chopped apples, again separating by flotation further residues of stems and seeds from the shredded apple meat in the said aqueous oxidation inhibitor solution, rinsing chemical solution from the shredded apple meat, cooking the shredded apple meat in a gaseous atmosphere comprising wet steam under super atmospheric pressure, adding sugar and water to the cooked apple sauce and finishing the apple sauce by removing last vestiges of stems, seeds, and other extraneous residues.

References Cited in the file of this patent

UNITED STATES PATENTS

| | | |
|---|---|---|
| 2,028,970 | Ewell | Jan. 28, 1936 |
| 2,298,933 | Elion | Oct. 13, 1942 |
| 2,390,468 | Schroder et al. | Dec. 4, 1945 |
| 2,411,896 | Richmond | Dec. 3, 1946 |
| 2,471,170 | Scott et al. | May 24, 1949 |
| 2,475,838 | Johnson | July 12, 1949 |
| 2,582,396 | Rooker | Jan. 15, 1952 |

OTHER REFERENCES

"Everybody's Cook Book," Lord, page 396 (1924).